United States Patent [19]

Jarowski

[11] Patent Number: 5,559,142
[45] Date of Patent: Sep. 24, 1996

[54] AMINO ACID SUPPLEMENTATION OF DIETARY PROTEINS

[76] Inventor: Charles I. Jarowski, 67 Harbor La., Massapequa Park, N.Y. 11762

[21] Appl. No.: 310,350

[22] Filed: Sep. 22, 1994

[51] Int. Cl.⁶ ........................ A61K 31/40; A61K 31/505; A61K 31/19

[52] U.S. Cl. .......................... 514/419; 514/423; 514/258; 514/557; 514/561; 514/579

[58] Field of Search ................................ 514/2, 561, 562, 514/564, 565, 566, 400, 419, 423, 258, 557, 561

[56] References Cited

U.S. PATENT DOCUMENTS 3,080,234   3/1963   Jarowski ..................................... 424/11

Primary Examiner—Kevin E. Weddington

[57] ABSTRACT

A universal dietary supplement for proteins consisting of a blend of four essential amino acids was developed. A unit dose consisting of a blend of 80 mg of L-Tryptophan, 90 mg of L-Methionine, 103 mg of L-Valine and 128 mg of L-Lysine Monohydrochloride; taken after meals, will improve the biological value and net protein utilization of individual and combinations of proteins. The levels of supplementation were derived by taking into consideration the average fasting plasma concentrations of the eight essential amino acids, and two nonessential amino acids. L-Tyrosine and L-Cystine, of several adult males and females. The two nonessential amino acids were included since they are phenylalanine and methionine sparing, respectively. The ideal protein for humans is considered to be a multiple of the fasting plasma concentrations expressed in millimoles. The variation in protein composition makes it impractical to attain the ideal. However, a study of the essential amino acid composition of 61 commonly consumed proteins revealed that three of the ones present in the lowest concentrations, in other words, the first, second and third limiting essential amino acids, will become less limiting after administration of the unit dose. In all cases at least three of the essential amino acids in the unit dose will match the first three limiting ones in the various proteins. Such strategic supplementation will result in greater net protein utilization and lower excesses of underutilized amino acids, thereby reducing the possibility of their being converted to undesirable metabolic products, such as, urea, cholesterol and triglycerides.

1 Claim, No Drawings

AMINO ACID SUPPLEMENTATION OF DIETARY PROTEINS

This invention relates to the supplementation of dietary proteins with a selected blend of four essential amino acids to improve their biologic value and net protein utilization.

Nutritionists have established that several amino acids are essential for normal growth and well-being in animals, including man. Since they cannot be synthesized by the body, they must be provided in free or combined form in the diet to meet the requirements of cellular protein synthesis and to fulfill other metabolic roles. For most of the animals studied it is generally agreed that the essential amino acids include, L-arginine, L-histidine, L-isoleucine, L-leucine, L-Lysine, L-methionine, L-phenylalanine, L-valine, L-threonine and L-tryptophan. In humans, the first two mentioned are regarded as non-essential. Scientists have also established that a part of the methionine requirement can be replaced by cystine and cysteine. In addition, a part of the phenylalanine requirement can be replaced by tyrosine.

This information is obviously very useful in evaluating potential dietary sources of protein. Thus, for example, gelatin, which contains practically no tryptophan, is clearly inadequate as a sole source of dietary protein. Likewise zein, which is deficient in tryptophan and lysine, is inadequate as a sole source of dietary protein. The net protein utilization and biologic value of gelatin will be improved by supplementation with L-tryptophan. Similarly, the nutritional value of zein will be enhanced by supplementation with L-tryptophan and L-lysine.

For optimum nutrition, however, it is desirable that the amino acid requirements of the body be placed on a more quantitative basis, so that the essential amino acids can be provided in the daily diet in the proper proportions. If a poor protein is ingested, large excesses of some of the amino acids will be present in the plasma, whereas others will be in such short supply that the body's amino acid reserve will be partially consumed.

Simple urinary excretion of any large excesses of both essential or non-essential amino acids is not expected to occur based on the work of R. Elman ("Parenteral Alimentation in Surgery", Paul B. Hoeher, New York, N.Y., (1948)). In his study 50 grams of an amino acid mixture was given intravenously over the course of one hour. Within one hour after the completion of the administration the plasma amino acid concentrations returned to their initial levels. However, urinary excretion of amino acids during this period was less than 2%.

Instead of simple urinary excretion, excess amino acids in the plasma are converted to other substances by intermediary metabolic processes. Thus, H. Kamin and P. Handler ("Metabolism of Parenterally Administered Amino Acids. II. Urea Synthesis", J. Biol. Chem., 188, 193, (1951)) reported that metabolism of the amino acids followed their accumulation in various tissues. By-products of such metabolism are urea and ammonia which appear in the urine.

Bose et al (Bose, A. K., Kapoor, N. K., and Nityanand, S., "Incorporation of Glycine $2^{14}$ Carbon into Cholesterol and Fatty Acids in Rats", Ind. J. Exp. Biol. II. 452 (1973)) reported that glycine labeled with carbon-14 is incorporated into liver cholesterol and fatty acids by rats. Caspi et al (Caspi, E., Jones, J. G. L., and Heidel, S. P., "In Incorporation of the S-Methyl Group of Methionine into Cholesterol in Rats", Chem. Comm., 1201 (1971)) also reported that rats incorporated the S-methyl group of methionine into cholesterol. Thus, it is evident that the ingestion of a poorly balanced protein could lead to an increase in lipid synthesis.

A U.S. Pat. No. 3,080,234, entitled "Method of Improving the Efficiency of Amino Acid Diets", was granted to the author, C. I. Jarowski, in 1963. The fasting plasma concentrations of the essential amino acids for a given animal species was used as a basis for calculating their optimal dietary proportions. The fasting plasma proportions were used to determine the order of limiting essential amino acids. This method also enabled one to calculate the levels of supplementation to be used to improve the quality of a given protein. Thus, Jarowski et al showed that liquid diets, which were taken orally and in which the essential amino acids matched their proportions in the fasting plasma of Sprague-Dawley rats, exhibited excellent growth (Jarowski, C. I., Puccini, A. V., Winitz, M., and Otey, M. C. "The Utility of Fasting Essential Amino Acid Plasma Levels in the Formulation of Nutritionally Adequate Diets I Sprague-Dawley Rats" Agr. Biol. Chem., 35, 1007 (1971)). In another study the fasting plasma profile of Wistar rats and the average fasting profile for humans, were found to fit the data published by other investigators (Jarowski, C. I., "The Utility of Fasting Essential Amino Acid Plasma Levels in the Formulation of Nutritionally Adequate Diets. II. Wistar Rats and Premature Infants", Agr. Biol. Chem., 38, 479 (1974).

Graham et al (Graham, G. C., Placko, R. P., Acevedo, G., Morales, E., and Cordano, A., "Lysine Enrichment of Wheat Flour: Evaluation in Infants", Amer. J. Clin. Nutrition, 22, 1459 (1969)) calculated that 0.12% L-lysine should be added to Wheat Flour (11% protein) to make lysine and threonine equally limiting. They arrived at this level of supplementation by comparing the essential amino acid concentrations of human breast milk and wheat protein. Higher levels of supplementation were also studied (0.2 mud 0.4%). The higher levels, according to Graham et al, should produce no further enhancement in the biologic value of wheat protein, for beyond the 0.12% level threonine becomes limiting. However feeding studies in infants revealed that enrichment to the 0.2% level resulted in further increases in the rate of weight gain and nitrogen retention over that observed at the 0.12% level. Enrichment to the 0.4% level resulted in a further increase in nitrogen retention but an insignificant increase in weight gain.

Application of the fasting plasma profile concept affords an explanation for the results obtained. Based on a comparison of wheat protein with mother's milk, lysine is first limiting and threonine is the second limiting essential amino acid. However, when the proportions of the essential amino acids of wheat protein are compared with the fasting plasma proportions, lysine is the first limiting and valine is the second limiting essential amino acid. Furthermore the level of lysine should be 0.23% to make lysine and valine equally limiting. This figure of 0.23% neatly conforms with the experimental results of Graham et al.

Calculation of the first, second and third limiting essential amino acids in 61 commonly consumed proteins was made. Surprisingly, four of the eight essential amino acids were found to be among the first, second and third limiting essential amino acids in 60 of them. As a consequence a blend of the four, when used as a dietary supplement, would insure that the dietary proteins ingested would be more efficiently converted to protein systemically. The following blend is exemplary,

| | |
|---|---|
| L-Tryptophan | 80 mg |
| L-Methionine | 90 mg |
| L-Valine | 103 mg |
| L-Lysine Monohydrochloride | 128 mg (120 mg of Lysine) |

-continued

Total 401 mg

For oral administration this powder blend could be placed in an aluminum foil package, in a Number 0 hard gelatin capsule, or given as a scored compressed tablet. The blend proportions were arrived at by conducting the type of calculations shown in Table I. Similar calculations were conducted on all 61 of the protein sources. Relevant data resulting from such calculations are presented in Table II.

The Fasting Plasma Profile Equivalents (FPPE) were derived by use of the following Equation:

$$FPPE = \frac{\text{Concentration of the Essential Amino Acid (mM)}}{\text{Plasma Concentration of the Amino Acid (mM/Liter)}}$$

For example: The human FPPE of Tryptophan in 100 grams of Cow's Milk protein is 132

TABLE I

The Percentages of the Essential Amino Acids in Cow's Milk Utilized in Protein Synthesis After Oral Administration with and wihtout Supplementary Amino Acids.

| | Tryptophan (M.W. 204.2) | Threonine (M.W. 119.1) | Isoleucine (M.W. 131.2) | Leucine (M.W. 131.2) | Lysine (M.W. 146.2) | Methionine (M.W. 149.2) plus 1/2 Cystine | Phenylalanine (M.W. 165.2) plus Tyrosine | Valine (M.W. 117.2) |
|---|---|---|---|---|---|---|---|---|
| 1 Average Human Fasting Plasma Concentrations (mM/Liter) | 0.052 | 0.114 | 0.061 | 0.113 | 0.170 | 0.117 | 0.106 | 0.210 |
| 2. Cow's Milk (3.5% Protein (mM/2857 grams) | 6.86 | 38.57 | 48.57 | 74.85 | 53.14 | 24.00 | 57.43 | 58.57 |
| 3. Cow's Milk FPPE Values/2857 grams) | 132 | 338 | 796 | 662 | 313 | 205 | 542 | 279 |
| 4. Line 3 Values − 132 | 0 | 206 | 664 | 530 | 181 | 73 | 410 | 147 |
| 5. Line 3 Values + 0.78 gram, L-Tryptophan | 205 | 338 | 796 | 662 | 313 | 205 | 542 | 279 |
| 6. Line 5 Values − 205 | 0 | 133 | 591 | 457 | 108 | 0 | 337 | 74 |
| 7. Line 3 Values + 1.56 grams L-Tryptophan + 1.29 grams L-Methionine | 279 | 338 | 796 | 662 | 313 | 279 | 542 | 279 |
| 8. Line 7 Values − 279 | 0 | 59 | 517 | 383 | 34 | 0 | 263 | 0 |

Percentages of the Essential Amino Acids Utilized in Protein Synthesis: Unsupplemented 35%; L-Tryptophan Supplemented Ration 53%; L-Tryptophan + L-Methionine Supplemented Ratio 70%.
Levels of Supplementation for 28.57 grams of Cow's Milk or 1 gram of Protein: L-Tryptophan alone 7.8 mg; L-Tryptophan 15.6 mg + 12.9 mg of L-Methionine.

EXPLANATION OF THE DATA IN TABLE I

Line 1.

The average human fasting plasma concentrations were derived from published data.

(a) E. G. Frame, "The Levels of Individual Free Amino Acids in the Plasma of Normal Man at Various Intervals After a High-Protein Meal", J. Clin. Invest., 37, 1710 (1958).

(b) S. Moore and W. H. Stein, "Procedure for the Chromatographic Determination of Amino Acids on Four Per Cent Cross-Linked Sulfonated Polystyrene Resins" J. Biol. Chem., 211, 893 (1954).

(c) S. W. Hier and O. Bergeim, "The Microbiological Determination of Certain Free Amino Acids in Human and Dog Plasma" J. Biol. Chem., 163, 129 (1946).

Line 2.

Literature data were converted to millimoles per 100 grams of Protein. Thus, for example, 100 grams of protein is contained in 2857 grams of Cow's milk ( 3.5% protein).

(a) M. L. Orr and B. K. Watt, "Amino Acid Content of Foods", Home Economics Research Report Number 4, U.S. Department of Agriculture, Washington, D.C., December, (1957).

Line 3.

$$FPPE = \frac{6.86}{0.052} = 132$$

Line 4.

The limiting essential amino acid in Cow's Milk is Tryptophan which has the smallest FPPE value. All of the limiting essential amino acid will be the first to be consumed when the protein is ingested. On the basis of the Fasting Plasma Profile Concept, one subtracts the FPPE value of 132 from the other seven essential amino acids in order to determine the percentage of essential amino acids utilized. For example:The Mount of Threonine remaining after all the tryptophan has been consumed:

$$FPPE = \frac{\text{Concentration of Threonine (mM/100 grams of Protein)}}{\text{Threonine Concentration in the Fasting Plasma}}$$

$$206 = \frac{X}{0.114 \text{ (mM/Liter)}}$$

$X = 206 \times 0.114 \times 0.001 \times 119.1 = 2.8$ grams

The original amount of Threonine in 100 grams of protein is:

$$338 = \frac{X}{0.114 \text{ (mM/Liter)}}$$

$X = 338 \times 0.114 \times 0.001 \times 119.1 = 4.59$ grams

Thus, after calculating the initial weights of each of the essential amino acids and the weights remaining after depletion of the limiting amino acid, tryptophan, one can determine that Cow's Milk protein is utilized merely 35%.

Line 5.

To make Tryptophan and Methionine (the second limiting amino acid) equally limiting one must add sufficient Tryptophan as a supplement so that its FPPE value equals 205 (FPPE value for Methionine).

To illustrate:

$$205 - 132 = 73$$

$$73 = \frac{X}{\text{Concentration in the Fasting Plasma}}$$

$$X = 73 \times 0.052 \times 0.001 \times 204.2$$
$$X = 0.78 \text{ gram (Supplementary Tryptophan)}$$

Line 6.

When Tryptophan supplemented Cow's Milk is ingested both the Tryptophan and Methionine will the first to be depleted. The percentage of the essential amino acids utilized in protein systhesis, 53%, was calculated in a similar manner as described on the previous page for Line 4.

Line 7.

Tryptophan, Methionine and Valine have been made equally limiting by the addition of supplementary Tryptophan and Methionine. To illustrate:

$$279 - 132 = 147$$

$$147 = \frac{X}{\text{Concentration of Tryptophan in the Fasting Plasma}}$$

$$X = 147 \times 0.052 \times 0.001 \times 204.2$$
$$X = 1.56 \text{ grams of supplementary Tryptophan}$$

$$279 - 205 = 74$$

$$74 = \frac{X}{\text{Concentration of Methionine in the Fasting Plasma}}$$

$$X = 74 \times 0.117 \times 0.001 \times 149.2$$
$$X = 1.29 \text{ grams of supplementary Methionine}$$

Line 8.

Since Tryptophan, Methionine and Valine have been made equally limiting, all three will be the first to be consumed when the supplemented protein is ingested. The percentage of essential amino acids utilized for protein synthesis, 70%, was calculated in a similar manner as described on the previous page for Line 4.

The data in Table II represents a compilation of data for 61 protein sources. The method of calculating the data is illustrated in and explained under Table I.

TABLE II

Effect of Amino Acid Supplementation on the Percentage of Essential Amino Acids Utilized for Sixty-one Protein Sources.

| Protein Sources +/− Supplementary Amino Acids (mg/gram of Protein) | Percentage of Essential Amino Acids Utilized | (1st Limiting) or Equi-Limiting |
|---|---|---|
| I. Milk, Milk Products | | |
| Human Milk (1.4% Protein) | 43 | (Tryptophan) |
| Plus Tryp. 10.3 | 67 | Tryp., Val. |
| Plus Tryp. 10.5, Val. 0.5 | 68 | Tryp., Val., Me. |
| Cow's Milk (3.5% Protein) | 35 | (Tryptophan) |
| Plus Tryp. 7.8 | 53 | Tryp., Me. |
| Plus Tryp. 10.5, Me. 12.9 | 70 | Tryp., Me., Val. |
| Evaporated Cow's Milk (7%) | 35 | (Tryptophan) |
| Plus Tryp. 7.6 | 53 | Tryp., Me. |
| Plus Tryp. 15.6, Me. 13.1 | 69 | Tryp., Me., Val. |
| Casein (100% Protein) | 32 | (Tryptophan) |
| Plus Tryp. 8.3 | 51 | Tryp., Me. |
| Plus Tryp. 18.5, Me. 16.8 | 71 | Tryp., Me., Val. |
| Lactalbumin (100% Protein) | 49 | (Tryptophan) |
| Plus Tryp. 2.5 | 55 | Tryp., Val. |
| Plus Tryp. 16.8, Val. 33 | 80 | Tryp., Val., Lys. |
| Cheddar Cheese (25% Protein) | 43 | (Tryptophan) |
| Plus Tryp. 6.5 | 56 | Tryp., Me. |
| Plus Tryp. 15.5, Me. 14.8 | 73 | Tryp., Me., Thre. |
| II. Eggs, Chicken (12.8% Protein) | 41 | (Tryptophan) |
| Plus Tryp. 10.8 | 64 | Tryp., Lys. |
| Plus Tryp. 15.6, Lys. 11.2 | 73 | Tryp., Lys., Val. |
| Chicken Egg White (85.9%) | 36 | (Tryptophan) |
| Plus Tryp. 10.4 | 62 | Tryp., Lys. |
| Plus Tryp. 18.5, Lys., 18.7 | 75 | Tryp., Lys., Val. |
| III. Meat, Poultry, Fish | | |
| Beef Carcass (18.8% Protein) | 32 | (Tryptophan) |
| Plus Tryp. 12.3 | 65 | Tryp., Val. |
| Plus Tryp. 13, Val. 1.5 | 66 | Tryp., Val., Me. |
| Lamb Carcass (17.1% Protein) | 38 | (Tryptophan) |
| Plus Tryp. 8.2 | 60 | Tryp., Val. |
| Plus Tryp. 11.4, Val. 7.4 | 72 | Tryp., Val., Me. |
| Pork Carcass (17.1% Protein) | 38 | (Tryptophan) |
| Plus Tryp. 10.5 | 64 | Tryp., Val. |
| Plus Tryp. 14, Val. 8.1 | 72 | Tryp., Val., Me. |
| Veal Carcass (19.7% Protein) | 38 | (Tryptophan) |
| Plus Tryp. 9.2 | 63 | Tryp., Val. |
| Plus Tryp. 9.8, Val. 1.2 | 64 | Tryp., Val., Me. |

TABLE II-continued

Effect of Amino Acid Supplementation on the Percentage of
Essential Amino Acids Utilized for Sixty-one Protein Sources.

| Protein Sources +/− Supplementary Amino Acids (mg/gram of Protein) | Percentage of Essential Amino Acids Utilized | (1st Limiting) or Equi-Limiting |
|---|---|---|
| Chicken Flesh (20.6% Protein) | 35 | (Tryptophan) |
| Plus Tryp. 9 | 60 | Tryp., Val. |
| Plus Tryp. 13.9, Val. 11.3 | 71 | Tryp., Val., Me. |
| Blue Fish (20.5% Protein) | 29 | (Tryptophan) |
| Plus Tryp. 13.1 | 63 | Tryp., Val. |
| Plus Tryp. 18.1, Val. 11.6 | 76 | Tryp., Val., Me. |
| IV. Legumes, Nuts and Seeds | | |
| Peanuts (26.9% Protein) | 41 | (Tryptophan) |
| Plus Tryp. 4.8 | 54 | Tryp., Lys. |
| Plus Tryp. 6.5, Lys. 4 | 60 | Tryp., Lys., Me. |
| Lima Beans (7.5% Protein) | 35 | (Tryptophan) |
| Plus Tryp. 1.8 | 40 | Tryp., Me. |
| Plus Tryp. 14.1, Me. 20.2 | 70 | Tryp., Me., Lys. |
| Soybeans (34.9% Protein) | 41 | (Tryptophan) |
| Plus Tryp. 8.5 | 63 | Tryp., Me. |
| Plus Tryp. 9.7, Me. 1.9 | 66 | Tryp., Me., Val. |
| Pinto Beans (23% Protein) | 26 | (Tryptophan) |
| Plus Tryp. 4.4 | 38 | Tryp., Me. |
| Plus Tryp. 16.9, Me. 20.6 | 67 | Tryp., Me., Val. |
| Almonds (18.6% Protein) | 30 | (Tryptophan) |
| Plus Tryp. 3.9 | 42 | Tryp., Lys. |
| Plus Tryp. 14, Lys. 24 | 68 | Tryp., Lys., Me. |
| Cashews (18.5% Protein) | 47 | (Lysine) |
| Plus Lys. 16.7 | 63 | Lys., Tryp. |
| Plus Lys. 42, Tryp. 5.7 | 75 | Lys. Tryp., Thre. |
| Sesame Seed (19.3% Protein) | 35 | (Lysine) |
| Plus Lys. 9.9 | 46 | Lys., Tryp. |
| Plus Lys. 16.2, Tryp. 2.7 | 52 | Lys., Tryp., Val. |
| Sunflower Meal (39.5% Protein) | 45 | (Tryptophan) |
| Plus Tryptophan 1.3 | 49 | Tryp., Lys. |
| Plus Tryp. 10.5, Me. 21.6 | 72 | Tryp., Lys., Val. |
| Cottonseed Flour and Meal (42.3) | 51 | (Methionine) |
| Plus Me. 5.6 | 60 | Me., Tryp. |
| Plus Me. 8.2, Tryp. 1.6 | 64 | Me., Tryp., Lys. |
| Lentil Beans (25% Protein) | 28 | (Tryptophan) |
| Plus Tryp. 1.8 | 35 | Tryp., Me. |
| Plus Tryp. 14.9, Me. 21.5 | 72 | Tryp., Me., Val. |
| Peas (23.8% Protein) | 30 | (Tryptophan) |
| Plus Tryp. 6.6 | 48 | Tryp., Me. |
| Plus Tryp. 13.7, Me. 11.7 | 65 | Tryp., Me., Val. |
| Coconut meal (20.3% Protein) | 29 | (Tryptophan) |
| Plus Tryp. 9.3 | 56 | Tryp., Lys. |
| Plus Tryp. 16.7, Lys. 17.1 | 73 | Tryp., Lys., Me. |
| Safflower Meal (42.1% Protein) | 39 | (Methionine) |
| Plus Me. 8.2 | 56 | Me., Lys. |
| Plus Me. 9.1, Lys. 1.2 | 57 | Me., Lys., Tryp. |
| V. Grains | | |
| Barley (12.8% Protein) | 42 | (Tryptophan) |
| Plus Tryp. 2 | 49 | Tryp., Lys. |
| Plus Tryp. 9.2, Lys. 16.9 | 69 | Tryp., Lys., Val. |
| White Bread + 4% Nonfat Dry Milk (8.5% Protein) | 35 | (Tryptophan) |
| Plus Tryp. 0.7 mg | 37 | Tryp., Lys. |
| Plus Tryp. 11.5, Lys. 25.1 | 66 | Tryp., Lys., Val. |
| Field Corn (10.5% Protein) | 17 | (Tryptophan) |
| Plus Tryp. 6.1 | 34 | Tryp., Lys. |
| Plus Tryp. 14.4, Lys. 19.6 | 55 | Tryp., Lys., Me. |
| Corn Flour (7.8% Protein) | 17 | (Tryptophan) |
| Plus Tryp. 6.3 | 34 | Tryp., Lys. |
| Plus Tryp. 15, Lys. 20.4 | 76 | Tryp., Lys., Me. |
| Corn Gluten (10% Protein) | 15 | (Tryptophan) |
| Plus Tryp. 6.3 | 34 | Tryp., Lys. |
| Plus Tryp. 16.4, Lys. 33.8 | 53 | Tryp., Lys., Val. |
| Zein (16.1% Protein) | 0 | (Tryp., Lys.) |
| Plus Tryp. 17, Lys. 41 | 38 | Tryp., Lys., Me. |
| Plus Tryp. 17.6, Lys 42.5, Me. 1.5 | 39 | Tryp., Lys., Me., Val. |
| Brown Rice (7.5% Protein) | 31 | (Tryptophan) |
| Plus Tryp. 6.2 | 49 | Tryp., Lys. |
| Plus Tryp. 10.4, Lys. 9.9 | 59 | Tryp., Lys., Me. |
| Wheat (14% Protein) | 41 | (Lysine) |

TABLE II-continued

Effect of Amino Acid Supplementation on the Percentage of Essential Amino Acids Utilized for Sixty-one Protein Sources.

| Protein Sources +/− Supplementary Amino Acids (mg/gram of Protein) | Percentage of Essential Amino Acids Utilized | (1st Limiting) or Equi-Limiting |
|---|---|---|
| Plus Lys. 1.2 | 48 | Lys., Tryp. |
| Plus Lys. 19.4, Tryp. 7.8 | 70 | Lys., Tryp., Val. |
| Rye (12.1% Protein) | 38 | (Tryptophan) |
| Plus Tryp. 6.1 | 58 | Tryp., Lys. |
| Plus Tryp. 11.1, Lys. 11.9 | 71 | Tryp., Lys., Val. |
| Oatmeal (14.2% Protein) | 40 | (Tryptophan) |
| Plus Tryp. 2.8 | 49 | (Tryptophan) |
| Plus Tryp. 12.2, Lys. 22.6 | 73 | Tryp., Lys., Me. |
| Sorghum (11% Protein) | 30 | (Tryptophan) |
| Plus Tryp. 0.4 | 31 | Tryp., Lys. |
| Plus Tryp. 12, Lys. 27 | 57 | Tryp., Lys., Me. |
| VI. Leafy Vegetables | | |
| Cabbage (1.4% Protein) | 58 | (Tryptophan) |
| Plus Tryp. 3.9 | 72 | Tryp., Val. |
| Plus Tryp. 10, Val. 14 | 89 | Tryp., Val., Me. |
| Kale (3.9% Protein) | 46 | (Tryptophan) |
| Plus Tryp. 1.4 | 52 | Tryp., Me. |
| Plus Tryp. 2.7, Me. 2.1 | 57 | Tryp., Me., Lys. |
| Spinach (2.3% Protein) | 48 | (Tryptophan) |
| Plus Tryp. 7.5 | 69 | Tryp., Val. |
| Plus Tryp. 9.2, Val. 3.9 | 71 | Tryp., Val., Me. |
| Turnip Greens (2.9% Protein) | 50 | (Tryptophan) |
| Plus Tryp. 3.5 | 61 | Tryp., Lys. |
| Plus Tryp. 6.4, Lys. 6.7 | 69 | Tryp., Lys., Me. |
| Watercress (1.7% Protein) | 11 | (Methionine) |
| Plus Me. 20.4 | 53 | Me., Tryp. |
| Plus Me. 29.5, Tryp. 5.5 | 68 | Me., Tryp., Val. |
| Collards (3.9% Protein) | 51 | (Tryptophan) |
| Plus Tryp. 4.6 | 68 | Tryp., Me. |
| Plus Tryp. 8, Me. 7.9 | 78 | Tryp., Me., Val. |
| VII. Other Vegetables | | |
| Asparagus (2.2% Protein) | 41 | (Methionine) |
| Plus Me. 5.6 | 56 | Me., Tryp. |
| Plus Me. 16.4, Tryp. 6.6 | 82 | Me., Tryp., Phe. |
| Snap Beans (2.4% Protein) | 52 | (Tryptophan) |
| Plus Tryp. 1.9 | 59 | Tryp., Me. |
| Plus Tryp. 7, Me. 8.4 | 76 | Tryp., Me., Val. |
| Cherry Tomatoes (1% Protein) | 21 | (Methionine) |
| Plus Me. 7.5 | 46 | Me., Tryp. |
| Plus Me. 13.3, Tryp. 3.5 | 63 | Me., Tryp., Val. |
| Peppers (1.2% Protein) | 34 | (Tryptophan) |
| Plus Tryp. 0.7 | 37 | Tryp., Me. |
| Plus Tryp. 6.8, Me. 7 | 56 | Tryp., Me., Val. |
| Cucumbers (0.7% Protein) | 31 | (Methionine) |
| Plus Me. 1 | 34 | Me., Tryp. |
| Plus Me. 12.6, Tryp. 7 | 69 | Me., Tryp., Phe. |
| Mushrooms (*Lactarius spp.* 2.9% Prot.) | 17 | (Tryptophan) |
| Plus Tryp. 2.1 | 29 | Tryp., Phe. |
| Plus Tryp. 3.8, Phe. 2.8 | 38 | Tryp., Phe., Me. |
| Onions (1.4% Protein) | 29 | (Methionine) |
| Plus Me. 6.3 | 49 | Me., Val. |
| Plus Me. 11.2, Val. 6.9 | 62 | Me., Val., Thre. |
| Potatoes (2% Protein) | 26 | (Methionine) |
| Plus Me. 5.6 | 39 | Me., Tryp. |
| Plus Me. 26.4, Tryp. 12.6 | 79 | Me., Tryp., Lys. |
| Sweet Potatoes (1.8% Protein) | 50 | (Tryptophan) |
| Plus Tryp. 2.8 | 57 | Tryp., Lys. |
| Plus Tryp. 2.8, Lys. 8 | 65 | Tryp., Lys., Me. |
| Beets (1.6% Protein) | 14 | (Methionine) |
| Plus Me. 8.9 | 46 | Me., Tryp. |
| Plus Me. 12.7, Tryp. 2.3 | 58 | Me., Tryp., Phe. |
| Carrots (1.2% Protein) | 27 | (Tryptophan) |
| Plus Tryp. 11.5 | 70 | Tryp., Lys. |
| Plus Tryp. 13.1, Lys. 6.2 | 75 | Tryp., Lys., Val. |
| Broccoli (3.3% Protein) | 40 | (Methionine) |
| Plus Me. 3.5 | 48 | Me., Tryp. |
| Plus Me. 16.2, Tryp. 7.8 | 77 | Me., Tryp., Lys. |
| Cauliflower (2.4% Protein) | 42 | (Methionine) |
| Plus Me. 3.1 | 48 | Me., Tryp. |
| Plus Me. 19.7, Tryp. 10.1 | 78 | Me., Tryp., Lys. |
| Squash (0.6% Protein) | 36 | (Tryptophan) |

TABLE II-continued

Effect of Amino Acid Supplementation on the Percentage of Essential Amino Acids Utilized for Sixty-one Protein Sources.

| Protein Sources +/− Supplementary Amino Acids (mg/gram of Protein) | Percentage of Essential Amino Acids Utilized | (1st Limiting) or Equi-Limiting |
|---|---|---|
| Plus Tryp. 0.7 | 40 | Tryp., Me. |
| Plus Tryp. 8.3, Me. 1.24 | 73 | Tryp., Me., Phe. |
| Eggplant (1.1% Protein) | 14 | (Methionine) |
| Plus Me. 6.8 | 31 | Me., Tryp. |
| Plus Me. 13.3, Tryp. 3.9 | 48 | Me., Tryp., Lys. |
| VIII. Fruits | | |
| Plantain (1.1% Protein) | 33 | (Tryptophan) |
| Plus Tryp. 4.9 | 55 | Tryp., Me. |
| Plus Tryp. 11.1, Me. 10.3 | 78 | Tryp., Me., Thr. |
| IX. Miscellaneous | | |
| Brewer's Yeast (36.9% Protein) | 44 | (Tryptophan) |
| Plus Tryp. 5.7 | 57 | Tryp., Me. |
| Plus Tryp. 12.6, Me. 11.3 | 70 | Tryp., Me., Val. |

It is surprising to note that 32 of the 61 protein sources in Table II would only have 35% or less of their essential amino acids converted to protein systemically. The resulting plasma excesses of essential and nonessential amino acids would be converted metabollically to undesirable by-products as mentioned earlier. Significant enhancement in biologic value and net protein utilization would result from strategic supplementation with essential amino acids. However tailoring supplemental levels for every protein and combinations of them would be impractical for lay individuals. On the other head, use of the 401 mg blend of the quartet of essential amino acids, tryptophan, methionine, valine and lysine, as a supplement, would enhance the biological value and net protein utilization for all 61 protein sources presented in Table II.

The advantage of using the quartet of amino acids as a nutritional supplement is its simplicity. This is demonstrated in Tables III and IV.

TABLE III

Data Selected from Table II for a meal Containing a Combination of Four Protein Sources.

| Protein Source | Protein Content (grams) | Percentage of the Essential Amino Acids Utilized | Second Level of Supplementation (mg/gram) |
|---|---|---|---|
| 1. Beef Carcass 53 grams (18.8% Protein) | 10 | 32% | Tryptophan 13 Valine 1.5 |
| 2. Wheat 29 grams (14% Protein) | 4 | 41% | Tryptophan 7.8 Lysine 19.4 |
| 3. Cabbage 71 grams (1.5% Protein) | 1 | 58% | Tryptophan 10 Valine 14 |
| 4. Peas 21 grams (23.8% Protein) | 5 | 30% | Tryptophan 13.7 Methionine 11.7 |

The following method was used to predict the percentage of essential amino acids utilized for protein synthesis by the above combination of four protein sources.

| Beef (32% Utilized) | $10 \times 32$ | = | 320 | |
| Wheat (41% Utilized) | $4 \times 41$ | = | 164 | |
| Cabbage (58% Utilized) | $1 \times 58$ | = | 58 | |
| Peas (30% Utilized) | $5 \times 30$ | = | 150 | |
| | Total: | | 692 | 692/20 = 34% |

The more detailed calculations shown in Table IV demonstrate that 33% of the essential amino acids in the unsupplemented ration would be utilized. This is an excellent agreement with the predicted 34%.

The weights of supplementary amino acids required for the 20 grams of protein in the ration were simply determined as follows:

| | 10 grams of Beef Protein |
|---|---|
| $10 \times 13 =$ | 130 mg of Tryptophan |
| $10 \times 1.5 =$ | 15 mg of Valine |
| | 4 grams of Wheat Protein |

13
-continued

| | |
|---|---|
| 4 × 7.8 = | 31.2 mg of Tryptophan |
| 4 × 19.4 = | 77.6 mg of Lysine |
| | 1 gram of Cabbage Protein |
| 1 × 10 = | 10 mg of Tryptophan |
| 1 × 14 = | 14 mg of Valine |
| | 5 grams of Pea Protein |
| 5 × 13.7 = | 68.5 mg of Tryptophan |
| 5 × 11.7 = | 58.5 mg of Methionine |
| | Total Quantities of Supplements required: |
| Tryptophan = | 130 + 31.2 + 10 + 68.5 = 239.5 mg |
| Valine = | 15 + 14 = 29 mg |
| Methionine = | 58.5 mg |
| Lysine = | 77.6 mg |

14

Three aliquots of the quartet of essential amino acids would provide mg of Tryptophan, 270 mg of Methionine, 309 mg of Valine and 306 mg of Lysine. The more detailed calculations in Table IV demonstrate that in spite of the excesses 62% of the essential amino acids in the supplemented ration were utilized for protein synthesis. This was derived by dividing the weight of unused amino acids (Line 20) by the weight of amino acids plus supplement (Line 16). Thus 3.586/9.397= 0.38. Since 38% was unused, then 62% of the essential amino acids was utilized. The unsupplemented ration was utilized 33%. Thus, 5. 511/8.272=0.67 unused amino acids, hence 33% utilized The Tryptophan supplemented ration was utilized 67%.

TABLE IV

The Percentages of the Essential Amino Acids in a Ration, Consisting of 10 grams of Beef Carcass Protein, 4 grams of Wheat Protein, 1 gram of Cabbage Protein, and 5 grams of Pea Protein, Utilized in Protein Synthesis with and without Supplementary Essential Amino Acids.

| | Tryptophan (M.W. 204.2) | Threonine (M.W. 119.1) | Isoleucine (M.W. 131.2) | Leucine (M.W. 131.2) | Lysine (M.W. 146.2) | Methionine (M.W. 149.2) plus 1/2 Cystine | Phenylalanine (M.W. 165.2) plus Tyrosine | Valine (M.W. 117.2) |
|---|---|---|---|---|---|---|---|---|
| 1. Average Human Fasting Plasma Concns (mM/Liter) | 0.052 | 0.114 | 0.061 | 0.113 | 0.170 | 0.117 | 0.106 | 0.210 |
| 2. Beef Carcass (18.8% Protein, mM/10 gms Protein) | 0.574 | 3.707 | 3.989 | 6.245 | 5.973 | 2.714 | 4.361 | 4.739 |
| 3. Wheat (14% Protein) (mM/4 gms Protein) | 0.240 | 0.960 | 1.320 | 2.040 | 0.750 | 1.130 | 2.020 | 1.580 |
| 4. Cabbage (1.5% Protein) (mM/1 gm Protein) | 0.036 | 0.229 | 0.214 | 0.307 | 0.321 | 0.214 | 0.243 | 0.264 |
| 5. Peas (23.8% Protein) (mM/5 grams Protein) | 0.256 | 1.618 | 2.145 | 3.154 | 2.507 | 0.940 | 2.639 | 2.389 |
| 6. Total mM in the 20 grams of Protein (Sum of Lines 2, 3, 4 and 5) | 1.106 | 6.514 | 7.668 | 11.746 | 9.551 | 4.998 | 9.263 | 8.972 |
| 7. Line 6 Values Converted to grams (mM × .001 × MW) | 0.25 | 0.776 | 1.006 | 1.541 | 1.396 | 0.746 | 1.530 | 1.052 |
| 8. Line 6 Values Converted to FPPE Values (mM/Line 1) | 21 | 57 | 126 | 104 | 56 | 43 | 87 | 43 |
| 9. Subtract 21 from the line 8 Values | 0 | 36 | 105 | 83 | 35 | 22 | 66 | 22 |
| 10. Convert Line 9 Values to grams (FPPE × .001 × MW × Line 1 Values). Sum of Line 10 Values = unused amino acids, 5.511 gms) | 0 | 0.489 | 0.840 | 1.231 | 0.870 | 0.384 | 1.156 | 0.541 |
| 11. Supplement with 0.234 gms of Tryptophan to make Tryptophan Methionine and Valine Equally Limiting (Added to Line 7) | 0.459 | 0.776 | 1.006 | 1.541 | 1.396 | 0.746 | 1.530 | 1.052 |
| 12. Convert Line 11 Values to mM | 2.248 | 6.514 | 7.668 | 11.746 | 9.551 | 4.998 | 9.263 | 8.972 |
| 13. Convert Line 12 Values to FPPE Values | 43 | 57 | 126 | 104 | 56 | 43 | 87 | 43 |
| 14. Subtract 43 from the Values in Line 13 | 0 | 14 | 83 | 61 | 13 | 0 | 44 | 0 |
| 15. Convert Line 14 Values to grams. Sum of Line 15 Values equals unused amino acids, 2.847 grams. | 0 | 0.190 | 0.660 | 0.904 | 0.323 | 0 | 0.770 | 0 |
| 16. Add 3 Aliquots of the Quartet of Amino Acids to the Values in Line 7 (240 mg of Tryptophan, 270 mg of methionine, 309 mg of Valine and 306 mg Lysine | 0.465 | 0.776 | 1.006 | 1.541 | 1.702 | 1.016 | 1.530 | 1.361 |
| 17. Convert Line 16 Values to millimoles | 2.277 | 6.514 | 7.668 | 11.746 | 11.642 | 6.81 | 9.263 | 11.61 |
| 18. Convert Line 17 to FPPE | 44 | 57 | 126 | 104 | 68 | 58 | 87 | 55 |

TABLE IV-continued

The Percentages of the Essential Amino Acids in a Ration, Consisting of 10 grams of Beef Carcass Protein, 4 grams of Wheat Protein, 1 gram of Cabbage Protein, and 5 grams of Pea Protein, Utilized in Protein Synthesis with and without Supplementary Essential Amino Acids.

| | Tryptophan (M.W. 204.2) | Threonine (M.W. 119.1) | Isoleucine (M.W. 131.2) | Leucine (M.W. 131.2) | Lysine (M.W. 146.2) | Methionine (M.W. 149.2) plus 1/2 Cystine | Phenylalanine (M.W. 165.2) plus Tyrosine | Valine (M.W. 117.2) |
|---|---|---|---|---|---|---|---|---|
| 19. Subtract 44 from the Values in Line 18 | 0 | 13 | 82 | 60 | 24 | 14 | 43 | 11 |
| 20. Convert Line 19 Values to grams. Sum of the Line 20 Values = unused amino acids, 3.586 grams. | 0 | 0.177 | 0.656 | 0.890 | 0.596 | 0.294 | 0.753 | 0.270 |

What is claimed is:

1. A method for improving the efficiency of amino acid utilization by humans which comprises providing a dietary supplement after meals, consisting of L-Tryptophan, L-Methionine, L-Valine and L-Lysine Monohydrochloride, in such amounts that the relative proportions of at least the first three limiting essential amino acids in the supplemented ration conform adequately to the respective proportions found in the blood plasma of humans upon fasting.

* * * * *